United States Patent
Black et al.

(10) Patent No.: US 9,667,919 B2
(45) Date of Patent: May 30, 2017

(54) METHOD AND SYSTEM FOR ANONYMOUS VIDEO ANALYTICS PROCESSING

(71) Applicant: IWATCHLIFE INC., Ottawa (CA)

(72) Inventors: Charles Black, Gatineau (CA); Jason Phillips, Lower Sackville (CA); Robert Laganiere, Gatineau (CA); Pascal Blais, Ottawa (CA)

(73) Assignee: IWATCHLIFE INC., Ottawa, Ontario (CA)

( * ) Notice: Subject to any disclaimer, the term of this patent is extended or adjusted under 35 U.S.C. 154(b) by 745 days.

(21) Appl. No.: 13/956,697

(22) Filed: Aug. 1, 2013

(65) Prior Publication Data

US 2014/0036073 A1    Feb. 6, 2014

Related U.S. Application Data

(60) Provisional application No. 61/678,993, filed on Aug. 2, 2012.

(51) Int. Cl.
*H04N 7/18*     (2006.01)
*H04L 12/64*    (2006.01)
*G06K 9/00*     (2006.01)

(52) U.S. Cl.
CPC .......... *H04N 7/18* (2013.01); *G06K 9/00771* (2013.01); *G06K 9/00979* (2013.01); *H04L 12/6418* (2013.01)

(58) Field of Classification Search
CPC .. H04N 7/18; H04L 12/6418; G06K 9/00771; G06K 9/00979
See application file for complete search history.

(56) References Cited

U.S. PATENT DOCUMENTS

| | | |
|---|---|---|
| 6,166,729 A | 12/2000 | Acosta et al. |
| 6,195,117 B1 | 2/2001 | Miyazaki et al. |
| 6,462,785 B1 | 10/2002 | Carraro et al. |
| 6,831,675 B2 | 12/2004 | Shachar et al. |
| 6,879,998 B1 | 4/2005 | Raciborski et al. |
| 7,111,045 B2 | 9/2006 | Kato et al. |

(Continued)

FOREIGN PATENT DOCUMENTS

| | | |
|---|---|---|
| JP | 2004120178 A | 4/2004 |
| JP | 2004180290 A | 6/2004 |

(Continued)

OTHER PUBLICATIONS

Saptharish, M. et al., "An Information Value Driven Architecture for Urban Video Surveillance in Data and Attention Bandwidth Constrained Environments," Proceedings of the Sixth IEEE International Conference on Advanced Video and Signal Based Surveillance, pp. 122-127, Sep. 2-4, 2009.

*Primary Examiner* — Sath V Perungavoor
*Assistant Examiner* — Xiaolan Xu
(74) *Attorney, Agent, or Firm* — Shapiro Cohen LLP (57) ABSTRACT

A method includes receiving, at a peer node, statistical data based on video data and relating to the video data, but other than a video content and an image content of the video data. In particular, the peer node is other than within a trusted group of nodes trusted for accessing the video data. At the peer node, the statistical data is analyzed to identify predetermined patterns therein. Upon identifying a predetermined pattern, a signal is provided to a trusted processor relating to the identified pattern.

18 Claims, 5 Drawing Sheets

(56) References Cited

U.S. PATENT DOCUMENTS

| | | |
|---|---|---|
| 7,382,244 B1 | 6/2008 | Donovan et al. |
| 7,839,926 B1 | 11/2010 | Metzger et al. |
| 7,881,505 B2 | 2/2011 | Schneiderman et al. |
| 8,041,338 B2 | 10/2011 | Chen et al. |
| 8,139,817 B2 | 3/2012 | Laganiere |
| 8,185,959 B2 | 5/2012 | Bellwood et al. |
| 8,290,999 B2 | 10/2012 | Shepherd et al. |
| 8,326,327 B2 | 12/2012 | Hymel et al. |
| 8,335,763 B2 | 12/2012 | Narayanan et al. |
| 8,396,246 B2 | 3/2013 | Anbalagan et al. |
| 8,433,136 B2 | 4/2013 | Epshtein et al. |
| 8,473,420 B2 | 6/2013 | Bohus et al. |
| 2002/0152092 A1 | 10/2002 | Bibas |
| 2003/0025599 A1 | 2/2003 | Monroe |
| 2003/0070177 A1 | 4/2003 | Kondo et al. |
| 2003/0107648 A1 | 6/2003 | Stewart et al. |
| 2003/0167176 A1 | 9/2003 | Knudson et al. |
| 2003/0204856 A1 | 10/2003 | Buxton |
| 2004/0240546 A1 | 12/2004 | Wells |
| 2005/0060532 A1 | 3/2005 | Dorenbosch |
| 2005/0169546 A1 | 8/2005 | Shin |
| 2005/0185823 A1 | 8/2005 | Brown et al. |
| 2005/0195823 A1 | 9/2005 | Chen et al. |
| 2005/0271250 A1 | 12/2005 | Vallone et al. |
| 2006/0053459 A1 | 3/2006 | Simerly et al. |
| 2006/0192698 A1 | 8/2006 | Morel |
| 2006/0195569 A1 | 8/2006 | Barker |
| 2006/0239645 A1 | 10/2006 | Curtner et al. |
| 2006/0271658 A1 | 11/2006 | Beliles |
| 2007/0013776 A1 | 1/2007 | Venetianer et al. |
| 2007/0035632 A1 | 2/2007 | Silvermail et al. |
| 2007/0082700 A1 | 4/2007 | Landschaft et al. |
| 2007/0172155 A1 | 7/2007 | Guckenberger |
| 2007/0217765 A1 | 9/2007 | Itoh et al. |
| 2008/0108339 A1 | 5/2008 | Shaffer et al. |
| 2008/0129844 A1 | 6/2008 | Cusack et al. |
| 2008/0136908 A1 | 6/2008 | Carter |
| 2008/0154908 A1* | 6/2008 | Datar ................ G06F 17/30817 |
| 2008/0166966 A1 | 7/2008 | Hamasaki et al. |
| 2008/0184245 A1 | 7/2008 | St-Jean |
| 2008/0209480 A1 | 8/2008 | Eide |
| 2008/0235592 A1 | 9/2008 | Trauth |
| 2008/0243614 A1 | 10/2008 | Tu et al. |
| 2008/0258880 A1 | 10/2008 | Smith et al. |
| 2008/0270490 A1 | 10/2008 | Watterott et al. |
| 2008/0271072 A1 | 10/2008 | Rothschild et al. |
| 2008/0279481 A1 | 11/2008 | Ando |
| 2008/0304565 A1 | 12/2008 | Sakhardande et al. |
| 2009/0015671 A1 | 1/2009 | Addy |
| 2009/0021583 A1 | 1/2009 | Salgar et al. |
| 2009/0031381 A1 | 1/2009 | Cohen et al. |
| 2009/0122150 A1 | 5/2009 | Shabtay et al. |
| 2009/0141939 A1 | 6/2009 | Chambers |
| 2009/0141993 A1 | 6/2009 | Ma et al. |
| 2009/0164797 A1* | 6/2009 | Kramer ................ G06F 21/32 713/186 |
| 2009/0174763 A1 | 7/2009 | Bengtsson |
| 2009/0189981 A1 | 7/2009 | Siann et al. |
| 2009/0213245 A1 | 8/2009 | Harper et al. |
| 2009/0216636 A1 | 8/2009 | Eliason |
| 2009/0217343 A1 | 8/2009 | Bellwood |
| 2009/0219387 A1 | 9/2009 | Marman |
| 2009/0219411 A1 | 9/2009 | Marman et al. |
| 2009/0225164 A1 | 9/2009 | Renkis |
| 2009/0238542 A1 | 9/2009 | Adiletta et al. |
| 2009/0245573 A1 | 10/2009 | Saptharishi et al. |
| 2009/0324137 A1 | 12/2009 | Stallings et al. |
| 2010/0097471 A1 | 4/2010 | Drive et al. |
| 2010/0158315 A1 | 6/2010 | Martin |
| 2010/0177938 A1 | 7/2010 | Martinez et al. |
| 2010/0191827 A1 | 7/2010 | Martin |
| 2010/0231714 A1 | 9/2010 | Flores et al. |
| 2010/0273463 A1 | 10/2010 | Bonnefoy et al. |
| 2011/0022529 A1 | 1/2011 | Barsoba et al. |
| 2011/0092248 A1 | 4/2011 | Evanitsky |
| 2011/0109742 A1* | 5/2011 | Laganiere .............. H04N 7/185 348/143 |
| 2011/0112899 A1 | 5/2011 | Strutton et al. |
| 2011/0157315 A1 | 6/2011 | Bennett et al. |
| 2011/0273563 A1 | 11/2011 | Murphy |
| 2011/0314159 A1 | 12/2011 | Murphy |
| 2012/0011267 A1 | 1/2012 | Ma et al. |
| 2012/0015668 A1 | 1/2012 | Mgrdechian et al. |
| 2012/0033026 A1 | 2/2012 | Murphy |
| 2012/0033027 A1 | 2/2012 | Murphy |
| 2012/0033028 A1 | 2/2012 | Murphy |
| 2012/0033031 A1 | 2/2012 | Murphy |
| 2012/0036262 A1 | 2/2012 | Murphy |
| 2012/0098918 A1 | 4/2012 | Murphy |
| 2012/0129553 A1 | 5/2012 | Phillips et al. |
| 2012/0179786 A1 | 7/2012 | Nandagopal |
| 2012/0195363 A1 | 8/2012 | Laganiere |
| 2012/0207349 A1 | 8/2012 | Murphy |
| 2012/0207356 A1 | 8/2012 | Murphy |
| 2014/0036073 A1 | 2/2014 | Black |
| 2014/0036090 A1 | 2/2014 | Black |

FOREIGN PATENT DOCUMENTS

| | | |
|---|---|---|
| JP | 2006279464 A | 10/2006 |
| WO | 2005004062 A2 | 1/2005 |
| WO | 2006012384 A2 | 2/2006 |
| WO | 2008092255 A1 | 8/2008 |
| WO | 2008154003 A2 | 12/2008 |
| WO | 2009111377 A1 | 9/2009 |

* cited by examiner

METHOD AND SYSTEM FOR ANONYMOUS VIDEO ANALYTICS PROCESSING

This application claims the benefit of U.S. Provisional Application No. 61/678,993 filed Aug. 2, 2012. The entire contents of U.S. Provisional Application No. 61/678,993 are incorporated herein by reference.

FIELD OF THE INVENTION

The invention relates generally to video analytics and more particularly to video analytics in the absence of video data.

BACKGROUND

In the art of video analytics, video frames are analyzed and compared in order to detect objects or events therein. Many researchers are working on different methods of extracting objects and events from video data. For example, extracting an object and tracking its motion is currently heavily studied. Another area that has found considerable interest is face extraction and analysis. As analysis methodologies improve, they become more effective. In time, they will likely gain in efficiency as well. That said, analysis requires considerable processing power and is therefore most commonly performed on a dedicated high performance system.

Another area garnering considerable attention is massively parallel processing. In massively parallel processing a same problem is distributed amongst a very large number of computer systems. For example, to break an encrypted message, different keys are provided to each of a large number of systems to "test" on the message. When a suitable decrypted message results it is passed to another system for review. As such, instead of serializing a brute force attack, the attack is highly parallelized. With 100,000,000 computers it is possible to test 100,000,000 keys at once being approximately 26 bits. Thus, a 40 bit key is reduced to the efficacy of a 14 bit key. As is evident from this example, there is considerable power in numbers especially for easily parallelized operations.

Another reason massively parallel computing is of interest is because most computer systems today are idle much of the time. Using up an idle resource is better than acquiring more resources for a same problem.

Unfortunately, massively parallel processing is ill suited to video analytics, not for technical reasons, but for privacy reasons. People do not want their video data to be publicly available as it would be in a massively parallel approach to video analytics. For example, a processor that is idle could analyze movement in a home based on video data, but that would allow that system, and potentially others, to view the hallway and what happens there. This is unlikely to be acceptable to everyone.

It would be advantageous to provide a method of video analytics that retains privacy of the video data and that is suitable to massively parallel application or to distributed processing on peer computers.

SUMMARY OF EMBODIMENTS OF THE INVENTION

According to an aspect of an embodiment of the invention there is provided a method comprising: receiving at a peer node statistical data based on video data and relating to the video data but other than a video content and an image content of the video data, the peer node other than within a trusted group of nodes trusted for accessing the video data; at the peer node, analyzing the statistical data to identify predetermined patterns therein; and, upon identifying a predetermined pattern, providing a first signal to a trusted processor relating to the identified pattern.

According to an aspect of an embodiment of the invention there is provided a method comprising: capturing video information at a transducer to provide video data; providing the video data to a server in communication with the transducer; providing statistical data to a peer node, the statistical data based on video data and relating to the video data but other than a video content and an image content of the video data, the peer node other than within a trusted group of nodes trusted for accessing the video data; at the peer node, analyzing the statistical data to identify predetermined patterns therein; upon identifying a predetermined pattern, providing a signal to the server relating to the identified pattern; and, processing the video data relating to the identified pattern by the server to determine an occurrence identifiable by video analytics.

According to an aspect of an embodiment of the invention there is provided a method comprising: receiving video data at a server; determining statistical data, the statistical data based on the video data and relating to the video data but other than a video content and an image content of the video data; providing the statistical data to a peer node, the peer node other than within a trusted group of nodes trusted for accessing the video data; at the peer node, analyzing the statistical data to identify predetermined patterns therein; upon identifying a predetermined pattern, providing a signal to the server relating to the identified pattern; and, processing the video data relating to the identified pattern by the server to determine an occurrence identifiable by video analytics.

According to an aspect of an embodiment of the invention there is provided a system comprising: a plurality of video cameras coupled together via a wide area network; at least a trusted server for receiving video data from the plurality of video cameras; a plurality of peer nodes in communication with the wide area network and for receiving statistical data, the statistical data based on video data and relating to the video data but other than a video content and an image content of the video data; and at least a processor for determining the statistical data, for directing the statistical data to peer nodes and for directing the video data from each of the plurality of video cameras to at least one of the at least a trusted server via the wide area network.

According to an aspect of an embodiment of the invention there is provided a method comprising: receiving video data from a source of video data; applying a transformation to the video data, the transformation being one of a numerical transformation and a geometrical transformation for resulting in irreversibly transformed video data; providing the irreversibly transformed video data to a peer system; at the peer system, analyzing the irreversibly transformed video data to identify predetermined patterns indicative of potential occurrences of events of interest within the video data; upon identifying a predetermined pattern, providing a first signal relating to the identified predetermined pattern from the peer system to a trusted processor.

According to an aspect of an embodiment of the invention there is provided a method comprising: receiving video data from a source of video data, the video data received in electronic form; extracting numerical descriptors of visual content from the video content; providing the extracted numerical descriptors to a peer system; at the peer system, analyzing the numerical descriptors to identify predetermined patterns indicative of potential occurrences of events of interest within the video data; and upon identifying a predetermined pattern, providing a first signal relating to the identified pattern from the peer system to a trusted processor.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
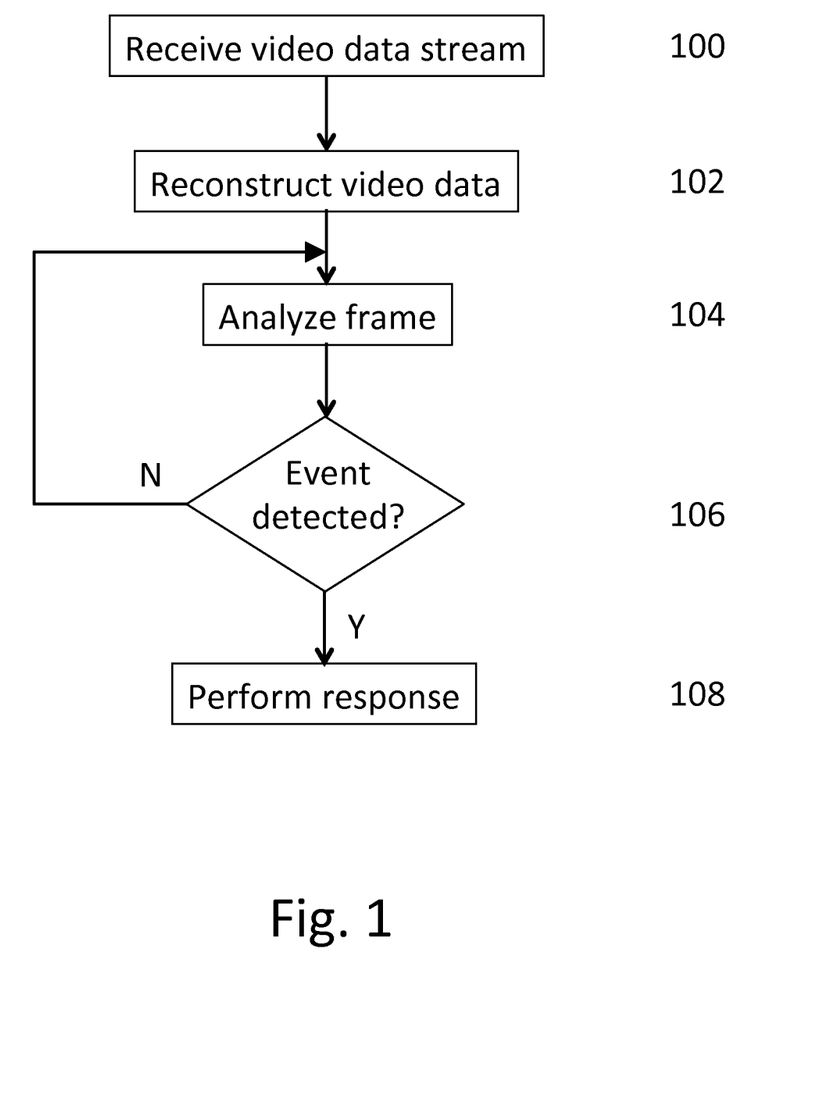
FIG. 1 is a simplified flow diagram of a prior art method of video analytics.

Referring to FIG. 1, shown is a simplified flow diagram of a prior art method of performing video analytics. A stream of video data is received at 100 from a video source. The stream of data is then reconstructed into a series of images representing the video information at 102. At 104, a first frame is analyzed to either extract an object or to form a baseline frame model. The next frame is analyzed in conjunction with the results of 104. When it is determined at 106 that a predetermined object is extracted, or that a predetermined event occurs, then a further action is performed at 108. This process is continued until all frames are analyzed. If this process were performed manually, an operator would look at each frame and identify, within the frames, events or objects of note. When certain events or objects are identified, the operator would initiate another operation. Thus, the images themselves forming part of the video data are available to the operator.

Figure 2:
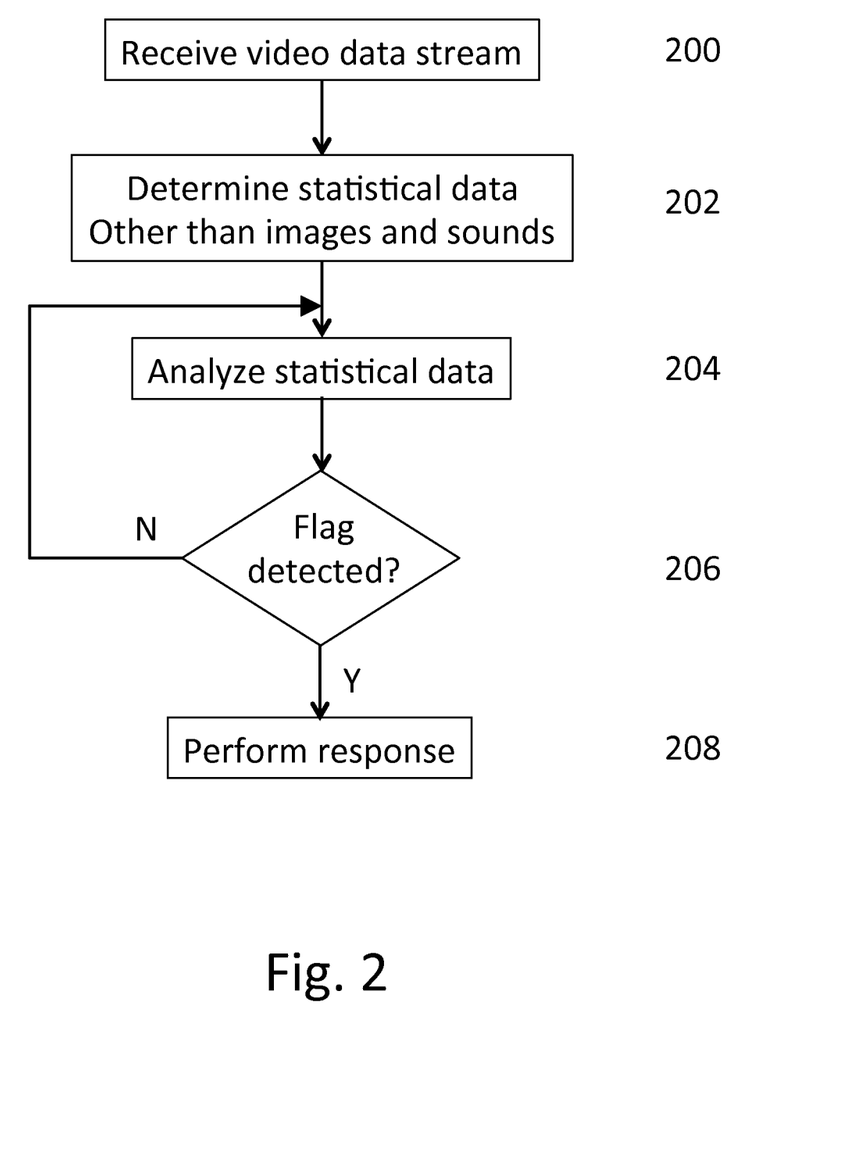
FIG. 2 is a simplified flow diagram of a method of video analytics according to an embodiment of the invention.

Referring to FIG. 2, shown is a simplified flow diagram of a method according to an embodiment of the instant invention. Here, a stream of video data is received at 200 from a video source. The stream of data is then analyzed to determine statistical data therefrom at 202. At 204, the statistical data is analyzed to find specific statistical flags therein. When it is determined at 206 that a statistical flag has been found, then a further action is performed at 208. Typically, the further action involves further processing of the video data.

Figure 3:
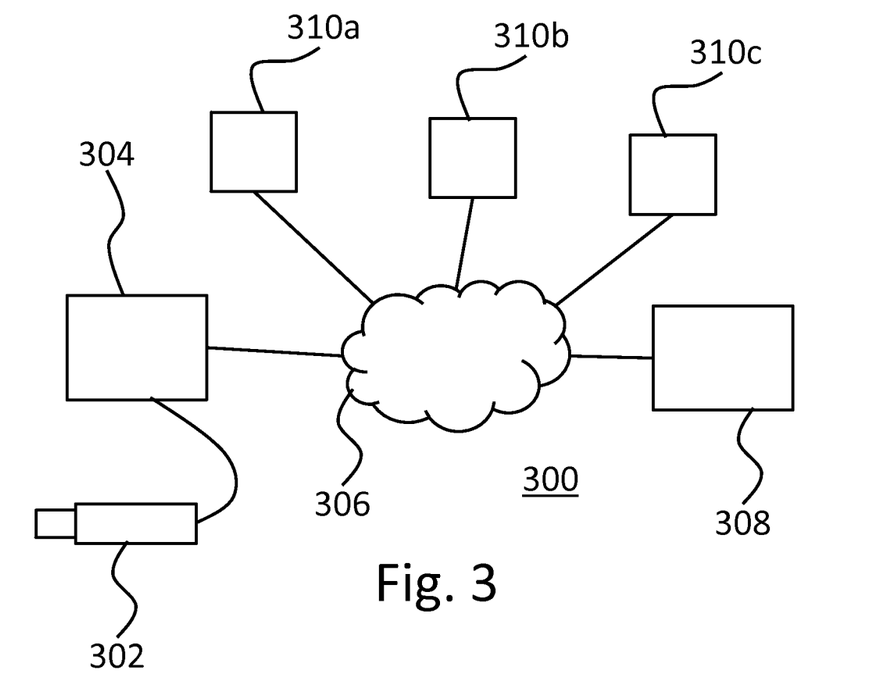
FIG. 3 is a simplified block diagram of a system for video analytics wherein statistical data is determinable at the video source.

Referring now to FIG. 3, shown is a simplified block diagram of a system 300 for implementing the method of FIG. 2. Here, a video source 302 is shown coupled to a processor 304 that is local to the video source. The processor is coupled to a wide area network in the form of the Internet 306, which is also coupled to server 308. The processor 304 statistically analyzes the video data to provide compressed video data at an output port thereof. In the compression process, statistical information about the video data is determined. This data often relates to inter frame similarities and differences which though useful when a single frame's data is present, is often less useful absent a complete frame. Further, some of these data are non-indicative of video data and image data content. For example, a number of frames between different frame types (I or P) is one such statistical measure indicative of inter frame changes but not of frame content.

The data that is determined by the processor 304 is provided to the server 308 via the wide area network. The server 308 analyzes the data to find specific statistical flags therein. When a statistical flag is found, then a further action is performed. For instance, the processor 304 performs additional processing of the video data, or the processor 304 provides the video data to the server 308 for additional processing.

Optionally, the server 308 receives the data that is determined by the processor 304, and then subsequently redirects the data to a plurality of peer systems 310a-310c. In this optional implementation, the peer systems 310a-310c analyze the data to find specific statistical flags therein. When a statistical flag is found, then a further action is performed. For instance, the processor 304 or the server 308 receives a notification that a statistical flag has been found, and either the processor 304 performs additional processing of the video data, or the processor 304 provides the video data to the server 308 for additional processing.

Figure 4:
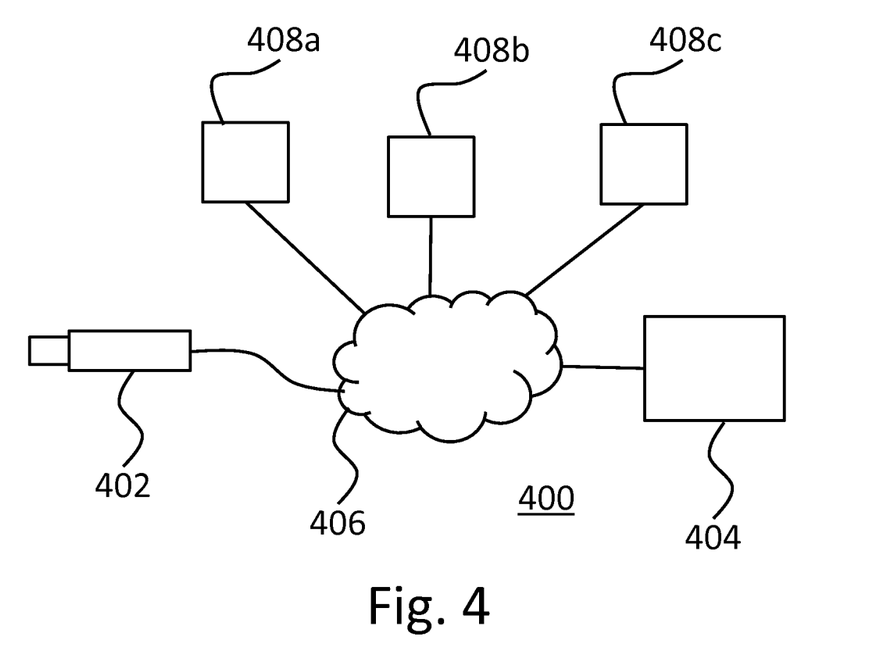
FIG. 4 is a simplified block diagram of a system for video analytics wherein statistical data is determinable at a system remote from the video source.

Referring now to FIG. 4, shown is a simplified block diagram of a system 400 for implementing the method of FIG. 2. Here, a video source 402 is shown coupled to a processor 404 that is remote from the video source 402, but that is known to an owner of the video source to be trustworthy. Both the processor and the video source are in communication with a wide area network 406 in the form of the Internet. The processor 404 extracts statistical information from a video data stream, which the processor 404 receives from the video source 402 via the wide area network 406. The processor 404 subsequently performs further analysis, or the statistical information is provided to other processors for further analysis. For example, interstitial I-frame time and frame sizes are tabulated and provided to another processor 408a-c for further analysis. The other processor 408a-c, which need not be trusted, therefore receives no private video data. Continuing this example, with the information that is provided from the processor 404 the other processor 408a-c analyzes the statistical data to determine a likelihood of an event or of an event type. When an event or event type is likely and forms a trigger, further analysis is warranted and is performed by a trusted system, such as processor 404. In this fashion, part of the analysis and video analytics process is off loaded to other processors 408a-c, which can be any other computer having available processing bandwidth.

The statistical data described is easily extracted from a video data stream. That said, other forms of statistical data that are either more or less processor intensive are also supported recognizing that the off loaded portion of the processing—searching—is often a processing portion that is time consuming since it is done over and over again. For example video data stream changes are statistical in nature, such as repeat period when one exists, interframe change, inter-P-frame changes, and so forth. Alternatively, more processing intensive methodologies are employed wherein transforms of video stream data or of video frame data are provided for further analysis by the other system.

Figure 5:
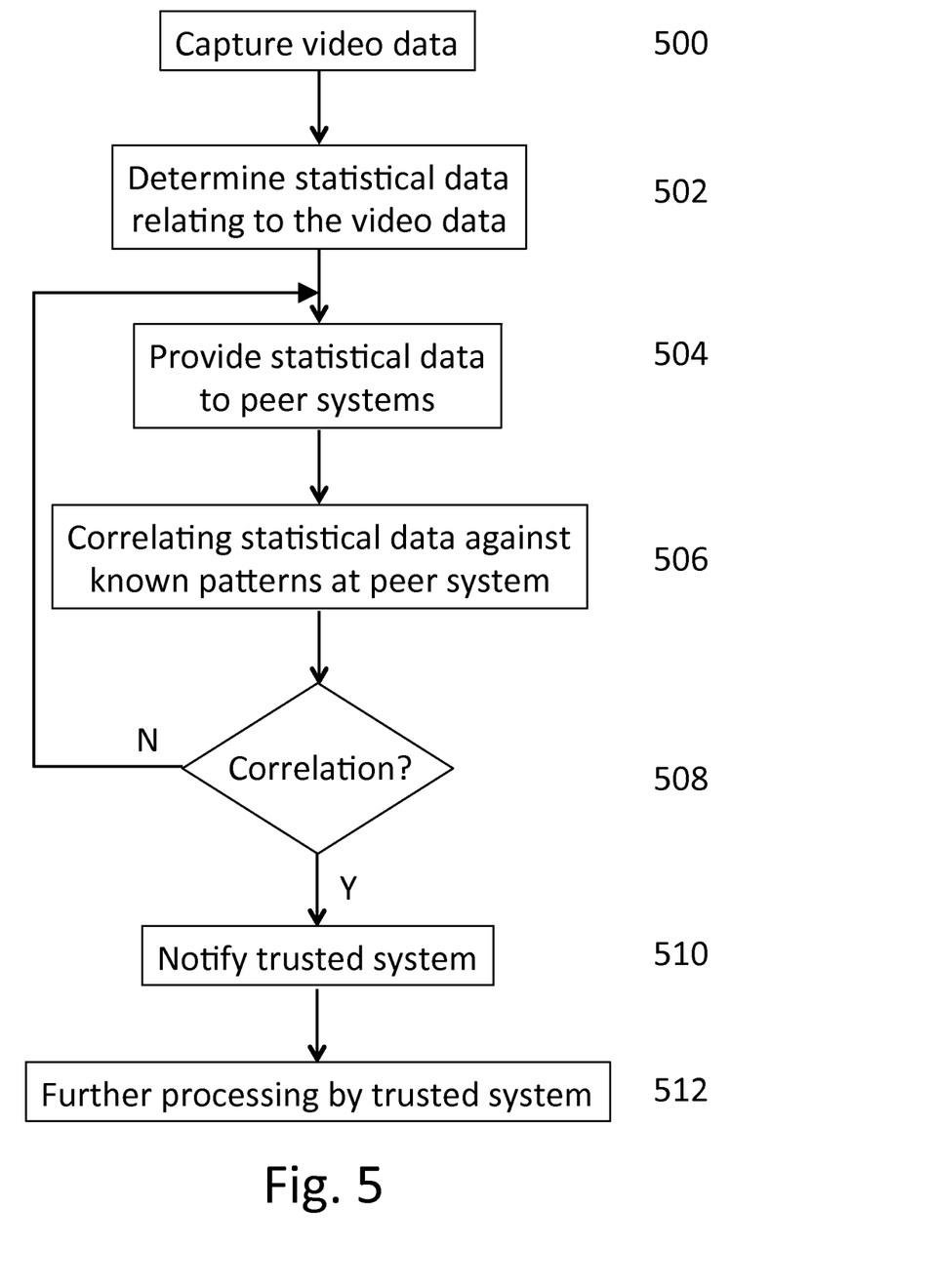
FIG. 5 is a simplified flow diagram of a method according to an embodiment of the invention.

Referring to FIG. 5, shown is a simplified flow diagram of a method according to an embodiment of the invention. Video data is captured at 500, using a video capture device at a source end. At 502, statistical data relating to the captured video data is determined. For instance, during processing of video data for transmission via a network, encoding of the data is typically performed. For example, a trusted system encodes the data in I-frames and P-frames. The encoding processor of the trusted system makes mathematical determinations relating to the data during said encoding process. Accordingly, some of the mathematical determinations are provided for transmission to a monitoring system to use same in monitoring the data for event potential. In such a process, no further processing of the data by a trusted system is required. Further, the mathematical data need not be extracted from the video data.

At 504 the mathematical data is directed to another system for correlative processing. For example, at 506 a peer computer is used to correlate the mathematical data against known patterns in order to flag some of the patterns. Optionally, the peer system does not know what a specific pattern correlates with, thereby improving overall privacy. Further optionally, the mathematical data is anonymous in nature such that the peer system does not know its exact origins.

Optionally, according to the method that is shown in FIG. 5 each video source transmits same mathematical data to each of a plurality of peer nodes via a redirecting server for maintaining anonymity. Each peer node analyzes the data for different patterns and reports back to the trusted system at 510 when the data is indicative of at least one of said patterns at 508. Thus, multiple processors scan for multiple different patterns in same data and even more processors scan for multiple patterns in multiple different data.

When a pattern is detected, then at 512 the trusted system once notified processes the video data relating to the extracted pattern or, alternatively, provides the data to another trusted processor for processing thereof.

Figure 6:
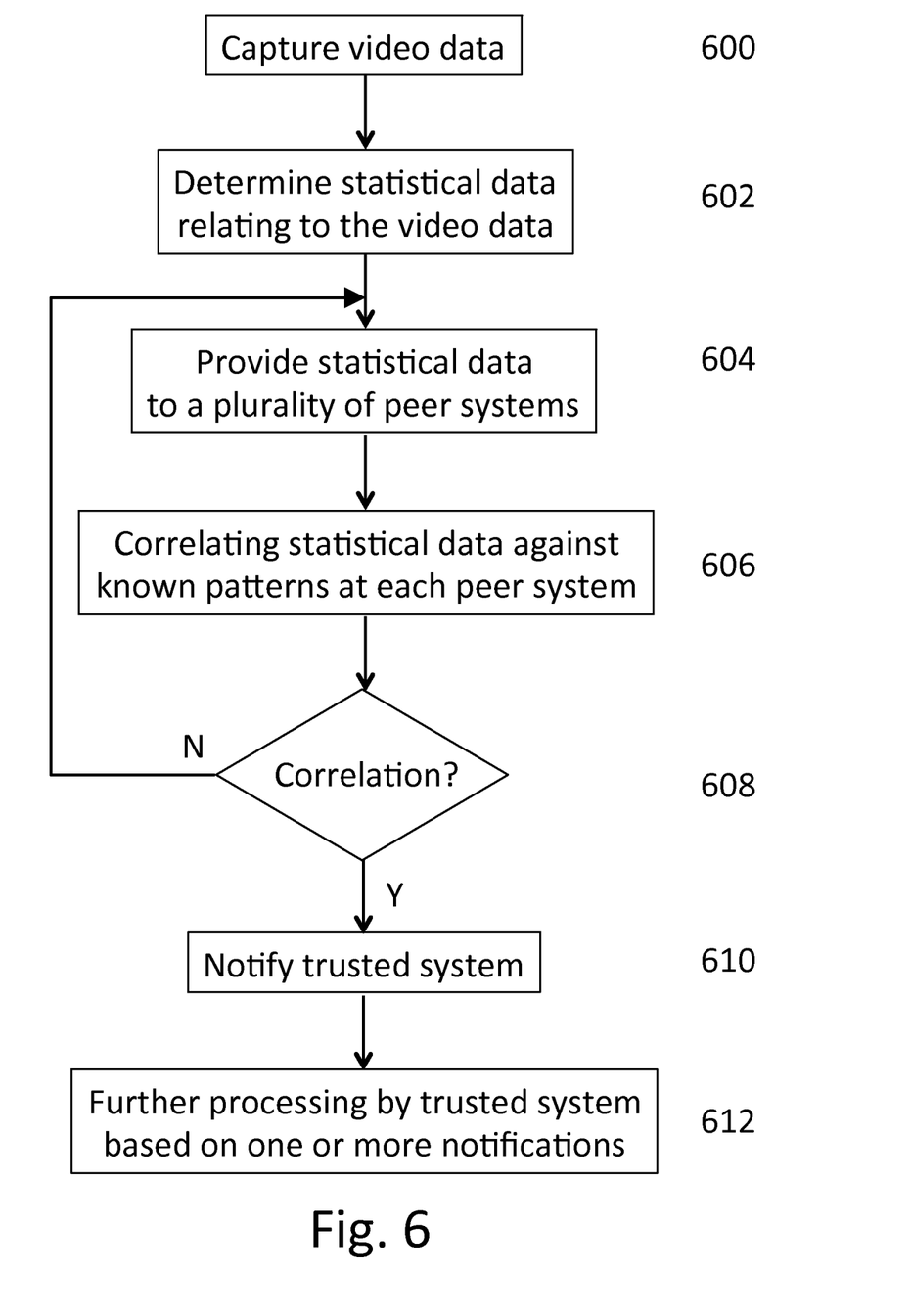
FIG. 6 is a simplified flow diagram of a method according to an embodiment of the invention.

Referring to FIG. 6, shown is another simplified flow diagram of a method according to an embodiment of the invention. Video data is captured at 600, using a video capture device at a source end. At 602, statistical data relating to the captured video data is determined. Here, similar to the method described with reference to FIG. 5, during processing of video data for transmission via a network, encoding of the data is typically performed. For example, a trusted system encodes the data in I-frames and P-frames. The encoding processor makes mathematical determinations relating to the data during said encoding process. Accordingly, some of the mathematical determinations are provided for transmission to a monitoring system to use same in monitoring the data for event potential. In such a process, no further processing of the data by the trusted system is required. Further, the mathematical data need not be extracted from the video data. Often, the encoding process is implemented in hardware.

At 604 the mathematical data is directed to a plurality of peer systems for correlative processing. For example, peer computers are used to correlate the mathematical data against known patterns in order flag some of the patterns. Optionally, the peer systems do not know what a specific pattern correlates with, thereby improving overall privacy. Further optionally, the mathematical data is anonymous in nature such that the peer systems do not know its exact origins.

Advantageously, as shown in FIG. 6, each video source transmits same mathematical data to each of a plurality of peer nodes at 604 via a redirecting server for maintaining anonymity. Each peer node analyzes the data for different patterns at 606 and reports back to the trusted system at 610 when the data is indicative of at least one of said patterns at 608. Thus, multiple processors scan for multiple different patterns in same data and, optionally, even more processors scan for multiple patterns in multiple different data.

When a pattern is detected at 608, the trusted system is notified at 610 and processes the video data at 612 based on detection of a plurality of patterns either by a same node, or as shown, by each of a plurality of different nodes. Though two nodes are shown each for analyzing based on different patterns, optionally some processes will be triggered by detection of three or more patterns at three or more peer nodes.

The data then processed by the trusted processor or by another trusted processor relates to the extracted patterns or is identified based on which patterns are extracted.

A method according to an alternative embodiment of the invention includes receiving video data from a source of video data. In particular, the video data is received at a system that is trusted for accessing the video data, such as a central server system. By way of a few specific and non-limiting examples, the video data is received from a video capture device such as a network camera; alternatively, the video data is previously captured video data received from a data storage device. The trusted system applies an irreversible transformation to the video data, rendering visual content of the video data unintelligible by a human. The irreversible transformation that is applied to the video data is one of a numerical transformation and a geometrical transformation, a specific and non-limiting example being the local binary pattern (LBP). Alternatively, an obfuscating reversible transformation is applied, for example one requiring a key, maintaining security and privacy while retaining the irreversibility of the transformed data in the absence of the key resulting in irreversibly transformed video data so long as the key is not provided to a recipient thereof.

The irreversibly transformed video data is provided from the trusted system to a peer system, the peer system typically being other than within a trusted group of systems trusted for accessing the video data. At the peer system, the irreversibly transformed video data is analyzed to identify predetermined patterns, which are indicative of occurrences of predetermined events of interest within the video data. Upon identifying a predetermined pattern, the peer system provides a signal to the trusted system or to another system relating to the identified pattern. Alternatively, in some cases the peer system requests the video data or a key for accessing the video data and is provided same upon indicating a presence of a known pattern.

Optionally, the peer system does not know what a specific pattern correlates with, thereby improving overall privacy. Further optionally, the irreversibly transformed video data are anonymous in nature such that the peer system does not know the exact origins of the original video data.

A method according to another alternative embodiment of the invention includes receiving video data from a source of video data. In particular, the video data is received at a system that is trusted for accessing the video data, such as a central server system. By way of a few specific and non-limiting examples, the video data is received from a video capture device such as a network camera, or alternatively the video data is previously captured video data received from a data storage device. The trusted system extracts numerical descriptors of visual content from the video content. In particular, the extracted numerical descriptors are other than useful for reconstructing the original video data, but at the same time pattern recognition techniques may be applied to the numerical descriptors.

The extracted numerical descriptors are provided from the trusted system to a peer system, the peer system being other than within a trusted group of systems trusted for accessing the video data. At the peer system, the extracted numerical descriptors are analyzed to identify predetermined patterns, which are indicative of occurrences of predetermined events of interest within the video data. Upon identifying a predetermined pattern, the peer system provides a signal to the trusted system or to another system relating to the identified pattern.

Optionally, the peer system does not know what a specific pattern correlates with, thereby improving overall privacy. Further optionally, the numerical descriptors are anonymous in nature such that the peer system does not know the exact origins of the original video data.

The embodiments presented are exemplary only and persons skilled in the art would appreciate that variations to the embodiments described above may be made without departing from the scope of the invention, which is solely defined by the appended claims.

What is claimed is:

1. A method comprising:
    receiving at an untrusted peer node statistical data based on video data and relating to the video data but other than a video content and an image content of the video data, the untrusted peer node other than within a trusted group of nodes trusted for accessing the video data, and wherein the peer node does not receive the video data;
    at the untrusted peer node, analyzing the statistical data to identify a predetermined pattern therein that is indicative of a potential occurrence of an event of interest within the video data; and,
    upon identifying the predetermined pattern, providing to a trusted processor a first signal relating to the identified pattern.

2. A method according to claim 1 comprising:
    determining by a trusted system, based on the video data, the statistical data relating to the video data but other than a video content and an image content of the video data; and,
    providing the statistical data but not the video data from the trusted system to the untrusted peer node, the untrusted peer node within a network and other than within a trusted group of nodes trusted for accessing the video data.

3. A method according to claim 1 comprising:
    receiving at a second other untrusted peer node second statistical data based on second video data and relating to the second video data but other than a video content and an image content of the second video data, the second other untrusted peer node other than within a second trusted group of nodes trusted for accessing the second video data, and wherein the second other untrusted peer node does not receive the second video data;
    at the second other untrusted peer node, analyzing the second statistical data to identify a predetermined pattern therein that is indicative of a potential occurrence of an event of interest within the second video data; and,
    upon identifying the predetermined pattern, providing to the trusted processor a second signal relating to the identified pattern.

4. A method according to claim 1 wherein;
    a plurality of video sources each provide statistical data to each of a plurality of untrusted peer nodes and wherein said video sources also provide video data to the trusted processor but not to any peer node of the plurality of untrusted peer nodes.

5. A method according to claim 3 wherein upon receiving one of the first signal and the second signal, the trusted processor processes a respective one of the first video data and the second video data relating to the identified pattern to determine an occurrence of a known event.

6. A method according to claim 5 comprising:
    when the occurrence of the known event is determined, initiating a further action.

7. A method according to claim 1 wherein the statistical data is other than usable for determining the one of the video content and the image content of the video data.

8. A method comprising:
    capturing video information at a transducer to provide video data;
    providing the video data to a trusted server in communication with the transducer;
    providing statistical data to an untrusted peer node, the statistical data based on the video data and relating to the video data but other than a video content and an image content of the video data, the untrusted peer node other than within a trusted group of nodes trusted for accessing the video data, and wherein the untrusted peer node does not receive the video data;
    at the untrusted peer node, analyzing the statistical data to identify predetermined patterns therein;
    upon identifying a predetermined pattern, providing a signal from the untrusted peer node to the trusted server relating to the identified pattern; and,
    using the signal relating to the identified pattern and provided from the untrusted peer node, processing the video data relating to the identified pattern by the trusted server to determine an occurrence identifiable by video analytics.

9. A method according to claim 8 wherein from the statistical data the untrusted peer node is unable to reformulate the video data in a visually representative form.

10. A method according to claim 8 wherein the untrusted peer node is one of a plurality of untrusted peer nodes and wherein statistical data provided to each of the plurality of untrusted peer nodes is same statistical data.

11. A method according to claim 8 wherein the untrusted peer node is one of a plurality of untrusted peer nodes and wherein statistical data provided to each of the plurality of untrusted peer nodes is different statistical data.

12. A method according to claim 8 wherein the statistical data is other than usable for determining the one of the video content and the image content of the video data.

13. A system comprising:
    a plurality of video cameras coupled together via a wide area network;
    at least a trusted server for receiving video data from the plurality of video cameras;
    a plurality of untrusted peer nodes in communication with the wide area network and for receiving statistical data, the statistical data based on the video data and relating to the video data but other than a video content and an image content of the video data, the plurality of untrusted peer nodes other than within a trusted group of nodes trusted for accessing the video data; and at least a trusted processor for determining the statistical data, for directing the statistical data but not the video data from each of the plurality of video cameras to peer nodes of the plurality of untrusted peer nodes, and for directing the video data from each of the plurality of video cameras to at least one of the at least a trusted server via the wide area network.

14. A system according to claim 13 comprising a signaling process in execution within each of the untrusted peer nodes for signaling the at least a trusted server in response to identifying within the statistical data a predetermined pattern.

15. A method comprising:
receiving video data at a trusted system from a source of video data;
applying a transformation to the video data by the trusted system, the transformation being one of a numerical transformation and a geometrical transformation for resulting in irreversibly transformed video data, wherein visual content of the video data is unintelligible by a human when the irreversibly transformed video data is displayed;
providing the irreversibly transformed video data from the trusted system to an untrusted peer system, and wherein the untrusted peer system does not receive the video data;
at the untrusted peer system, analyzing the irreversibly transformed video data to identify a predetermined pattern within the transformed video data that is indicative of a potential occurrence of an event of interest within the video data;
upon identifying the predetermined pattern within the transformed video data, providing a first signal relating to the identified predetermined pattern from the untrusted peer system to a trusted processor; and
using the trusted processor, analyzing the video data based on the first signal to identify the event of interest within the video data.

16. The method according to claim 15 wherein the transformation comprises an irreversible transformation to the video data.

17. The method according to claim 15 wherein the untrusted peer system is other than within a trusted group of systems trusted for accessing the video data.

18. The method according to claim 15 wherein the irreversibly transformed video data is other than usable for determining either one of video content and image content of the video data.

* * * * *